UnitedStates Patent Office 3,781,327
Patented Dec. 25, 1973

3,781,327
META-CARBANILATE ETHERS
Eugene G. Teach, El Cerrito, Calif., assignor to
Stauffer Chemical Company, New York, N.Y.
No Drawing. Filed Dec. 10, 1970, Ser. No. 97,004
Int. Cl. C07c 125/06
U.S. Cl. 260—471 C     13 Claims

ABSTRACT OF THE DISCLOSURE

Meta-carbanilate ethers and sulfides having the formula

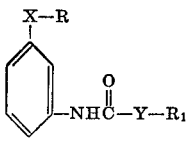

in which X is oxygen or sulfur; Y is oxygen or sulfur; R is branched and straight chain alkyl, alkenyl, vinyloxyalkyl, ketoalkyl, or alkylthioalkyl; and $R_1$ is alkyl or alkenyl. The compounds of this invention are useful as herbicides.

---

This invention relates to certain novel meta-carbanilate ethers and sulfides which are useful as herbicides. The compounds of the present invention are new compositions of matter and correspond to the general formula

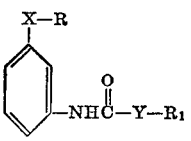

in which X is oxygen or sulfur; Y is oxygen or sulfur; R is alkyl, alkenyl, vinyloxyalkyl, alkylthioalkyl, or ketoalkyl; and $R_1$ is alkyl or alkenyl.

In the above description, the following embodiments are intended for the various substituent groups unless otherwise provided; for R, alkyl preferably includes those members which contain 1 to 10 carbon atoms, inclusive, in both straight chain and branched chain configurations, for example, methyl, ethyl, n-propyl, isopropyl, n-butyl, sec.-butyl, 1,1 - dimethylbutyl, amyl, isoamyl, 2,4,4-trimethylpentyl, n-hexyl, isohexyl, n-heptyl, n-octyl, isooctyl, nonyl, decyl, and 3,7-dimethyloctyl; for $R_1$, alkyl preferably includes those members which contain from 1 to 6 carbon atoms, inclusive, in straight and branched chain configurations, for example, ethyl, n-propyl, isopropyl, n-butyl, sec.-butyl, amyl, isoamyl, n-hexyl and isohexyl; alkenyl preferably includes those members containing 3 to 6 carbon atoms, inclusive. The terms vinyloxyalkyl and alkylthioalkyl preferably include those members in which the total carbon content is not more than 7, for example, vinyloxymethyl, vinyloxyethyl, vinyloxypentyl, methylthiomethyl, methylthioethyl, methylthiopropyl, ethylthioethyl, ethylthiopentyl, propylthiopropyl, propylthiobutyl, butylthiomethyl, hexylthiomethyl, and the like. By the term ketoalkyl, is meant those members of the group which have the formula

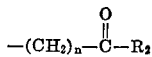

in which n is 1 or 2 and $R_2$ is alkyl containing from 1 to 4 carbon atoms, inclusive, in straight chain and branched chain configurations, for example, methyl, ethyl, n-propyl, isopropyl, n-butyl, sec.-butyl, tert.-butyl and the like.

The compounds of this invention have been found to be active herbicides of a general type. That is, certain members of the class have been found to be herbicidally effective against a wide range of plant species. A method of controlling undesirable vegetation of the present invention comprises applying an herbicidally effective amount of the above-described compounds to the area or plant locus where control is desired.

An herbicide is used herein to mean a compound which controls or modifies the growth of plants. By a "growth controlling amount" is meant an amount of compound which causes a modifying effect upon the growth of plants. Such modifying effects include all deviations from natural development, for example, killing, retardation, defoliation, desiccation, regulation, stunting, tillering, stimulation, dwarfing and the like. By "plants" it is meant germinating seeds, emerging seedlings, and established vegetation including the roots and above-ground portions.

The compounds of the present invention are prepared by several different methods, depending upon the nature of the starting materials and the products desired. In general, the compounds may be prepared by alkylating a meta-aminophenol or meta-aminothiophenol with a suitable alkyl halide in a solvent such as dimethylformamide, to first prepare the corresponding m-aminophenyl ether or sulfide. The ether or sulfide is then reacted with a suitable substituted chloroformate or chlorothioformate to ylield the corresponding meta-substituted carbanilate ether or sulfide. In each instance after the reaction is complete, the recovery of the product is carried out by normal workup procedures, such as crystallization, sublimation or distillation.

The compounds of the present invention and their preparation are more particularly illustrated by the following examples. Following the examples is a table of compounds which are prepared according to the procedures described herein.

EXAMPLE I

Preparation of 3'-isobutoxy methyl carbanilate

Eleven and six-tenths (11.6) grams of 3'-isobutoxy aniline is dissolved in 100 ml. of acetone and 5.6 g. of pyridine is added. Methyl chloroformate, 6.6 g., is added dropwise and pyridine hydrochloride precipitated. The reaction mixture is allowed to cool and is poured into approximately 500 ml. of cold water. The product is taken up in methylene chloride, washed with dilute (approximately 1%) NaOH and 5% HCl and dried over magnesium sulfate. The solvent is removed under vacuum. There is obtained 13.8 g. of the title compound, $n_D^{30} = 1.5240$.

EXAMPLE II

Preparation of 3'-isoamyloxy methyl thiocarbanilate

Twelve and one-half (12.5) grams of 3'-isoamyloxy aniline is dissolved in 100 ml. of acetone and 8 g. of triethylamine added. The mixture is cooled in a water bath with stirring and 7.5 g. of methyl chlorothiolformate is added portionwise. When reaction is complete, the mixture is poured into 500 ml. of cold water. The liquid product is taken up in 200 ml. of ethyl acetate and washed with dilute NaOH, dilute HCl, water and dried over magnesium sulfate. The ethyl acetate is distilled off under vacuum. There is obtained 15.4 g. of the title compound, a light amber oil, $n_D^{30} = 1.5553$.

EXAMPLE III

Preparation of 1(m-S-methylthiocarbamyl phenylthio) 3,3-dimethyl butyl sulfide

Ten and four-tenths (10.4) grams of 1(m-aminophenylthio)3,3-dimethyl butyl sulfide is dissolved in 100 ml. of acetone and 5.5 g. of triethylamine is added. The mixture is cooled in a water bath and 5.6 g. of methyl chlorothiolformate is added portionwise with stirring. The reaction mixture is poured into 500 ml. of water and the solid precipitate collected by filtration, washed with water and dried under vacuum. There is obtained 14 g. of the title compound, M.P. 70–73° C.

EXAMPLE IV

Preparation of 1(m-O-methylcarbamoyl phenylthio) 3,3-dimethylbutyl sulfide

Ten and four-tenths (10.4) grams of 1(m-aminophenylthio)3,3-dimethylbutyl sulfide is dissolved in 100 ml. of acetone and 5.5 g. of triethylamine is added. The mixture is cooled in a water bath. Methyl chloroformate, 4.8 g., is added portionwise with stirring. When the reaction is complete, the mixture is poured into 500 ml. of water and the oily product taken up in 100 ml. of methylene chloride, separated, washed with water and dried over magnesium sulfate. The methylene chloride is stripped off under vacuum. There is obtained 10.2 g. of the title compound as a yellow oil, $n_D^{30}=1.5730$.

The following is a table of the compounds which are prepared according to the aforementioned procedures. Compound numbers have been assigned to them and are used for identification throughout the balance of the specification.

HERBICIDAL SCREENING TESTS

As previously mentioned, the herein described compounds produced in the above-described manner are phytotoxic compounds which are useful and valuable in controlling various plant species. Compounds of this invention are tested as pre-emergence and post-emergence herbicides in the following manner.

Pre-emergence herbicide test.—On the day preceding treatment, seeds of seven different weed species are planted in individual rows using one species per row across the width of the flat. The seeds used are hairy crabgrass (*Digitaris sanguinalis* (L.) Scop.), yellow foxtail (*Setaria glauca* (L.) Beauv.), watergrass (*Echinochloa crusgalli* (L.) Beauv.), California red oat (*Avena sativa* (L.)), redroot pigweed (*Amaranthus retroflexus* (L.)), Indian mustard (*Brassica juncea* (L). Coss.) and curly dock (*Rumex crispus* (L.)). Ample seeds are planted to give about 20 to 50 seedlings per row, after emergence, depending on the size of the plants. The flats are watered after planting. The spraying solution is prepared by dissolving 50 mg. of the test compound in 3 ml. of a solvent, such as acetone, containing 1% Tween 20® (polyoxy-

TABLE I

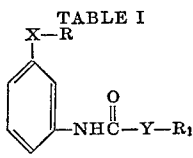

| Compound number | X | Y | R | R₁ | M.P., °C. or $n_D^{30}$ |
|---|---|---|---|---|---|
| 1 | O | O | i-C₄H₉ | C₂H₅ | 1.5085 |
| 2 | O | O | i-C₄H₉— | n-C₄H₉— | 1.5027 |
| 3 | O | O | i-C₅H₁₁— | C₂H₅— | 1.5062 |
| 4 | O | O | i-C₅H₁₁— | n-C₄H₉— | 1.5015 |
| 5 | O | O | CH₃COCH₂— | C₂H₅— | 1.4830 |
| 6 | O | O | (CH₃)₃CCOCO₂— | CH₃— | 1.5250 |
| 7 | O | O | (CH₃)₃CCOCH₂— | C₂H₅— | 1.5050 |
| 8 | O | O | (CH₃)₃CCOCH₂— | n-C₄H₉— | 1.4980 |
| 9 | O | O | (CH₃)₃CCH₂CH₂— | CH₃— | 1.5155 |
| 10 | O | O | i-C₄H₉— | CH₃— | 1.5248 |
| 11 | O | O | i-C₅H₁₁— | CH₃— | 1.5200 |
| 12 | O | O | (CH₃)₃CCH₂CH₂— | C₂H₅— | 1.5100 |
| 13 | O | O | (CH₃)₃CCH₂CH₂— | CH₂=CH—CH₂— | 1.5158 |
| 14 | O | O | i-C₅H₁₁— | (C₂H₅)₂CHCH₂— | 1.5028 |
| 15 | O | O | (CH₃)₃CCH₂CH₂— | (C₂H₅)₂CHCH₂— | 1.5018 |
| 16 | O | S | i-C₅H₁₁— | CH₃— | 1.5553 |
| 17 | O | S | (CH₃)₃CCH₂CH₂— | CH₃— | 1.5552 |
| 18 | O | O | CH₂=C(CH₃)CH₂— | CH₃— | 1.5386 |
| 19 | O | S | CH₂=C(CH₃)CH₂— | CH₃— | 1.5778 |
| 20 | O | O | C₃H₇CH(CH₃)CH₂— | CH₃— | 1.5150 |
| 21 | O | O | (CH₃)₂CH(CH₂)₃CH(CH₃)CH₂CH₂— | CH₃— | 1.5019 |
| 22 | O | S | C₃H₇(CH₃)CH₂— | CH₃— | 1.5490 |
| 23 | O | S | (CH₃)₂CH(CH₂)₃CH(CH₃)CH₂CH₂— | CH₃— | 1.5282 |
| 24 | O | O | (CH₃)₃CCOCH₂— | i-C₃H₇— | 1.5153 |
| 25 | O | O | CH₂=CH—O—CH₂CH₂— | CH₃— | ¹ 59–62 |
| 26 | O | S | CH₂=CH—O—CH₂CH₂— | CH₃— | ¹ 69–72 |
| 27 | S | O | (CH₃)₃CCH₂CH₂— | CH₃— | 1.5730 |
| 28 | S | S | (CH₃)₃CCH₂CH₂— | CH₃— | ¹ 70–73 |
| 29 | O | S | t-C₄H₉SCH₂— | CH₃— | 1.5712 |
| 30 | O | O | t-C₄H₉SCH₂— | i-C₃H₇— | 1.5410 |

¹ M.P., °C.

Other examples of compounds falling within the generic formulas presented herein, which are preparable by the aforedescribed procedures and which may be formulated into herbicidal compositions and applied as herein illustrated are:

| X | Y | R | R₁ |
|---|---|---|---|
| S | S | (CH₃)₃CCH₂CH₂— | CH₂=CH—CH₂— |
| S | S | CH₂=C(CH₃)CH₂— | CH₃— |
| S | S | CH₂=CH—O—CH₂CH₂— | C₃H₇CH(CH₃)— |
| S | S | (CH₃)₃CCOCH₂— | C₂H₅— |
| S | S | (CH₃)₃CCOCH₂— | i-C₃H₇— |
| S | S | CH₃COCH₂— | C₂H₅— |
| S | S | i-C₄H₉—S—CH₂— | C₂H₅— |
| S | S | t-C₄H₉—S—CH₂— | C₃H₇C(CH₃)₂— |
| S | O | (CH₃)₃CCH₂CH₂— | CH₂=CH—CH₂— |
| S | O | CH₂=C(CH₃)CH₂— | CH₃— |
| S | O | CH₂=CH—O—CH₂CH₂— | C₃H₇CH(CH₃) |
| S | O | (CH₃)₃CCOCH₂— | C₂H₅— |
| S | O | (CH₃)₃CCOCH₂— | i-C₃H₇— |
| S | O | CH₃COCH₂— | C₂H₅— |
| S | O | i-C₄H₉—S—CH₂— | C₂H₅— |
| S | O | t-C₄H₉—S—CH₂— | C₃H₇C(CH₃)₂— | ethylene sorbitan monolaurate). The following day each flat is sprayed at the rate of 20 pounds of the candidate compound per 142 gallons of solution per acre. An atomizer is used to spray the solution onto the soil surface. The flats are placed in a greenhouse at 80° F. and watered regularly. Two weeks later the degree of weed control is determined by comparing the amount of germination and growth of each weed in the treated flats with weeds in several untreated control flats. The rating system is as follows:

0=no significant injury (approximately 0–10 percent control)

3=slight injury (approximately 10–40 percent control)

6=moderate injury (approximately 40–70 percent control)

9=severe injury or death (approximately 70–100 percent control).

An activity index is used to represent the total activity on all seven weed species. The activity index is the sum of the numbers divided by 3, so that an activity index of 21 represents complete control of all seven weeds. The results of this test are reported in Table II.

Post-emergence herbicide test.—Seeds of five weed species, including hairy crabgrass, watergrass, California red oats, Indian mustard, and curly dock and one crop, pinto beans (*Phaseolus vulgaris*), are planted in flats as described above for pre-emergence screening. The flats are placed in the greenhouse at 72–85° F. and watered daily with a sprinkler. About 10 to 14 days after planting, when the primary leaves of the bean plant are almost fully expanded and the first trifoliate leaves are just starting to form, the plants are sprayed. The spray is prepared by weighing out 50 mg. of the test compound, dissolving it in 5 ml. of acetone containing 1% Tween 20® (polyoxyethylene sorbitan monolaurate) and then adding 5 ml. of water. The solution is sprayed on the foliage using an atomizer. The spray concentration is 0.5% and the rate would be approximately 20 lb./acre if all of the spray were retained on the plant and the soil, but some spray is lost, so it is estimated that the application rate is approximately 12.5 lb./acre.

Beans are used to detect defoliants and plant growth regulators. The beans are trimmed to two or three plants per flat by cutting off the excess weaker plants several days before treatment. The treated plants are placed back in the greenhouse and care is taken to avoid sprinkling the treated foliage with water for three days after treatment. Water is applied to the soil by means of a slow stream from a watering hose taking care not to wet the foliage.

Injury rates are recorded 14 days after treatment. The rating system is the same as described above for the pre-emergence test where 0, 3, 6, and 9 are used for the different rates of injury and control. The injury symptoms are also recorded. The maximum activity index for complete control of all the species in the post-emergence screening test is 18; this index represents the sum of the rating numbers obtained with the six plant species used in the test divided by 3. The herbicide activity index is shown in Table II.

TABLE II.—HERBICIDAL ACTIVITY—SCREENING RESULTS

| | Herbicidal activity index [1] | |
|---|---|---|
| | Pre-emergence (20 lb./a.) | Post-emergence (12.5 lb./a.) |
| Compound number: | | |
| 1 | 18 | 17 |
| 2 | 15 | 17 |
| 3 | 8 | 11 |
| 4 | 0 | 14 |
| 5 | 0 | 7 |
| 6 | 1 | 9 |
| 7 | 13 | 16 |
| 8 | 9 | 13 |
| 9 | 13 | 18 |
| 10 | 11 | 12 |
| 11 | 14 | 16 |
| 12 | 9 | 13 |
| 13 | 9 | 12 |
| 14 | 0 | 4 |
| 15 | 0 | 4 |
| 16 | 14 | 17 |
| 17 | 16 | 18 |
| 18 | 0 | 11 |
| 19 | 0 | 10 |
| 20 | 8 | 11 |
| 21 | 2 | 6 |
| 22 | 14 | 16 |
| 23 | 10 | 13 |
| 24 | 11 | 14 |
| 25 | 0 | 11 |
| 26 | 0 | 14 |
| 27 | 3 | 10 |
| 28 | 3 | 15 |
| 29 | 0 | 14 |
| 30 | 2 | 0 |

[1] 21=70–100% control of all seven plant species tested pre-emergence 18=70–100% control of all six plant species tested post-emergence.

The compounds of the present invention are used as pre-emergence or post-emergence herbicides and are applied in a variety of ways at various concentrations. In practice, the compounds are formulated with an inert carrier, utilizing methods well-known to those skilled in the art, thereby making them suitable for application as dusts, sprays, or drenches and the like, in the form and manner required. The mixtures can be dispersed in water with the aid of a wetting agent or they can be employed in organic liquid compositions, oil and water, water in oil emulsions, with or without the addition of wetting, dispersing or emulsifying agents. An herbicidally effective amount depends upon the nature of the seeds or plants to be controlled and the rate of application varies from 1 to approximately 50 pounds per acre.

The phytotoxic compositions of this invention employing an herbicidally effective amount of the compound described herein are applied to the plants in the conventional manner. Thus, the dust and liquid compositions can be applied to the plant by the use of power-dusters, boom and hand sprayers and spray-dusters. The compositions can also be applied from airplanes as a dust or a spray because they are effective in very low dosages. In order to modify or control growth of germinating seeds or emerging seedlings, as a typical example, the dust and liquid compositions are applied to the soil according to conventional methods and are distributed in the soil to a depth of at least ½ inch below the soil surface. It is not necessary that the phytotoxic compositions be admixed with the soil particles since these compositions also can be applied merely by spraying or sprinkling the surface of the soil. The phytotoxic compositions of this invention can also be applied by addition to irrigation water supplied to the field to be treated. This method of application permits the penetration of the compositions into the soil as the water is absorbed therein. Dust compositions, granular compositions or liquid formulations applied to the surface of the soil can be distributed below the surface of the soil by conventional means such as discing, dragging or mixing operations.

The phytotoxic compositions of this invention can also contain other additaments, for example, fertilizers, pesticides and the like, used as adjuvant or in combination with any of the above-described adjuvants. Other phytotoxic compounds useful in combination with the above-described compounds include, for example, 2,4-dichlorophenoxyacetic acids, 2,4,5 - trichlorophenoxyacetic acid, 2 - methyl - 4 - chlorophenoxyacetic acid and the salts, esters and amides thereof; triazine derivatives, such as 2,4-bis(3 - methoxypropylamino) - 6 - methyl - thio-s-triazine; 2 - chloro - 4 - ethylamino - 6 - isopropylamino-s-triazine, and 2 - ethylamino - 4 - isopropylamino - 6 - methylmercapto-s-triazine, urea derivatives, such as 3 - (3,4 - dichlorophenyl) - 1,1 - dimethyl urea and 3 - (p-chlorophenyl)-1,1-dimethyl urea and acetamides such as N,N-diallyl-α-chloroacetamide, 2 - chloro - N - isopropylacetanilide, 2 - chloro - 2,6' - diethyl - N - (methoxymethyl)acetanilide, and the like; benzoic acids such as 3-amino-2,5-dichlorobenzoic; and thiocarbamates, such as S-propyl dipropylthiocarbamate; S-ethyl-dipropylthiocarbamate, S-ethyl cyclohexyl - ethylthiocarbamate, S - ethyl hexahydro-1H-azepine - 1 - carbothioate and the like. Fertilizers useful in combination with the active ingredients include, for example, ammonium nitrate, urea and superphosphate. Other useful additaments include materials in which plant organisms take root and grow, such as compost, manure, humus, sand and the like.

The concentration of a compound of the present invention, constituting an effective amount in the best mode of administration in the utility disclosed, is readily determinable by those skilled in the art.

Various changes and modifications are possible without departing from the spirit and scope of the invention described herein and will be apparent to those skilled in the are to which it pertains. It is accordingly intended that the present invention shall only be limited by the scope of the claims.

What is claimed is:
1. A compound having the formula

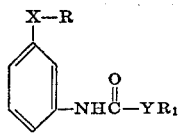

in which X is oxygen; Y is oxygen; R is alkyl having from 6 to 10 carbon atoms, inclusive, lower alkenyl, vinyloxyalkyl in which the total carbon content is from 3 to 7 carbon atoms, inclusive, ketoalkyl having from 2 to 6 carbon atoms, inclusive, or alkylthioalkyl in which the total carbon content is from 2 to 7 carbon atoms, inclusive; $R_1$ is lower alkyl or lower alkenyl.

2. A compound according to claim 1 in which R is alkyl having from 6 to 10 carbon atoms, inclusive, and $R_1$ is lower alkyl.

3. A compound according to claim 2 in which R is 3,3-dimethylbutyl and $R_1$ is methyl.

4. A compound according to claim 1 in which R is ketoalkyl having from 2 to 6 carbon atoms, inclusive, and $R_1$ is lower alkyl.

5. A compound according to claim 4 in which R is 3,3-dimethyl-2-butanonyl and $R_1$ is ethyl.

6. A compound according to claim 4 in which R is 3,3-dimethyl-2-butanonyl and $R_1$ is n-butyl.

7. A compound according to claim 4 in which R is 3,3-dimethyl-2-butanonyl and $R_1$ is isopropyl.

8. A compound according to claim 1 in which R is vinyloxyalkyl in which the total carbon content is from 3 to 7 carbon atoms, inclusive, and $R_1$ is lower alkenyl.

9. A compound according to claim 1 in which R is alkyl having from 6 to 10 carbon atoms, inclusive, and $R_1$ is lower alkenyl.

10. A compound according to claim 9 in which R is 3,3-dimethylbutyl and $R_1$ is allyl.

11. A compound according to claim 1 in which R is lower alkenyl and $R_1$ is lower alkyl.

12. A compound according to claim 2 in which R is 3,3-dimethylbutyl and $R_1$ is ethyl.

13. A compound according to claim 2 in which R is 2-methylpentyl and $R_1$ is methyl.

References Cited
UNITED STATES PATENTS
3,253,904   5/1966   Harrison _____ 260—471 C
3,636,079   1/1972   Koenig et al. _____ 260—471 C LORRAINE A. WEINBERGER, Primary Examiner
L. A. THAXTON, Assistant Examiner U.S. Cl. X.R.
71—98, 100, 111; 260—455 A, 470